US012140282B2

(12) United States Patent
Kay et al.

(10) Patent No.: US 12,140,282 B2
(45) **Date of Patent: *Nov. 12, 2024**

(54) RECESSED CURVED CHANNEL LIGHT SYSTEM

(71) Applicant: PureEdge Lighting LLC, Chicago, IL (US)

(72) Inventors: Gregory L. Kay, Chicago, IL (US); Samuel Welu, Chicago, IL (US)

(73) Assignee: PureEdge Lighting LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,583

(22) Filed: Apr. 11, 2023

(65) Prior Publication Data

US 2024/0044460 A1 Feb. 8, 2024

Related U.S. Application Data

(63) Continuation of application No. 17/817,592, filed on Aug. 4, 2022, now Pat. No. 11,635,177.

(51) Int. Cl.

| | |
|---|---|
| ***F21S 2/00*** | (2016.01) |
| ***F21S 4/22*** | (2016.01) |
| ***F21S 8/02*** | (2006.01) |
| ***F21V 21/30*** | (2006.01) |
| ***F21Y 103/10*** | (2016.01) |
| ***F21Y 115/10*** | (2016.01) |

(52) U.S. Cl.

CPC ................. *F21S 2/005* (2013.01); *F21S 4/22* (2016.01); *F21S 8/024* (2013.01); *F21S 8/026* (2013.01); *F21V 21/30* (2013.01); *F21Y 2103/10* (2016.08); *F21Y 2115/10* (2016.08)

(58) Field of Classification Search

CPC .... F21S 8/026; F21S 8/022; F21S 8/02; F21S 2/005; F21S 4/22; F21S 4/28; F21V 21/30

See application file for complete search history.

(56) References Cited

U.S. PATENT DOCUMENTS

| | | | | |
|---|---|---|---|---|
| 10,190,738 | B1 * | 1/2019 | James | F21S 4/28 |
| 10,619,828 | B2 * | 4/2020 | Tremaine | F21S 4/22 |
| 10,663,148 | B1 * | 5/2020 | Heredia | F21V 21/35 |
| 10,724,720 | B1 * | 7/2020 | Heredia | F21V 21/35 |
| D929,032 | S * | 8/2021 | Trzesniowski | D26/138 |

(Continued)

*Primary Examiner* — William N Harris

(74) *Attorney, Agent, or Firm* — Bishop Diehl & Lee, Ltd.

(57) ABSTRACT

A curving recessed lighting system having a plurality of pivoting, connectable channel sections, an LED strip (or more), and a flexible diffuser. Each housing section includes a base having connectable first and second ends, first and second flange members extending upward and outward therefrom and cut to both allow and limit pivoting between adjacent sections, and a U-shaped channel spaced from the flange members to create parallel channels. Flexible bands are secured within the parallel channels to isolate the LED strips within the U-shaped channel, as required. The flange members form two curved surfaces and the U-shaped channel in consecutive sections align to form a curved channel between the two curved surfaces. Preferably, the base portion of each of the plurality of housing sections has a depth not greater than ⅝ inches (0.625 inches). This allows flush placement in standard drywall without the need for notching studs.

20 Claims, 12 Drawing Sheets

(56) References Cited

U.S. PATENT DOCUMENTS

| | | | | |
|---|---|---|---|---|
| 11,746,969 | B1 * | 9/2023 | Kay | F21S 8/02 362/365 |
| 2009/0225546 | A1 * | 9/2009 | Pearson | F21V 21/005 362/249.06 |
| 2016/0356470 | A1 * | 12/2016 | Noh | F21V 29/74 |
| 2020/0149716 | A1 * | 5/2020 | Collado | F21S 4/28 |
| 2021/0231289 | A1 * | 7/2021 | Pruitt | F21V 3/02 |
| 2022/0107062 | A1 * | 4/2022 | Monsonego | F21V 21/005 |

* cited by examiner

RECESSED CURVED CHANNEL LIGHT SYSTEM

RELATED APPLICATION

The present application is a continuation of and claims the filing priority of U.S. patent application Ser. No. 17/817,592, titled "Recessed Curved Channel Light System," filed on Aug. 4, 2022, and now U.S. Pat. No. 11,635,177. The '177 patent is hereby incorporated by reference.

TECHNICAL FIELD OF THE INVENTION

The present invention relates to lighting systems. More specifically, the invention relates to customizable recessed channel lighting systems.

BACKGROUND OF THE INVENTION

Lighting is an important feature when designing or creating a work environment or living space. It is not enough that the lighting provides sufficient illumination to an area. Lighting and lighting fixtures have an aesthetic function as well. When done properly, lighting can be dynamic and flow as a user moves within the space. A commonly used permanent lighting design is recessed lighting where fixtures are recessed within a surface. The most popular recessed lights are circular, known as can lights, used in a ceiling surface. However, recessed channel lighting is used in ceilings and walls as well.

Recessed channel lights are different than track lighting in that they are installed, for example, into a hollow opening—usually a continuous channel—in a ceiling or wall surface (i.e., wall board). When installed, it appears that light is shining from the channel in the surface. Typically, little if any of the actual recessed lighting fixture is observable.

However, recessed lights are fixed light sources which cannot be readily moved without some skilled electrical re-wiring and surface patching. As a result, recessed lighting is often used as an accent to highlight another feature of a space. Another drawback of recessed lighting is that it requires either the lights be positioned between joists, or joists must be notched or altered in some way to accommodate the recessed fixture if it extends across joists. The cutting of ceiling or wall joists is time-consuming and, in many cases, an undesirable option.

Further, recessed lighting tends to have a "static" appearance, being comprised of circles and straight lines. This can limit creativity and, as a result, the aesthetics of recessed lighting.

The present invention provides a lighting system without the aesthetic drawbacks of prior lighting systems and without the lighting and installation limitations of standard recessed lights. By providing a customizable curving lighting system, aesthetics are significantly improved. The present lighting system can be installed without exposure of unsightly brackets and tracks and without the need to notch or otherwise alter existing studs or joists.

Until the invention of the present application, these and other problems in the prior art went either unnoticed or unsolved by those skilled in the art. The present invention provides a recessed channel lighting system which is capable of multiple configurations with the associated light fixtures without sacrificing design, style or affordability.

SUMMARY OF THE INVENTION

There is disclosed herein an improved recessed channel lighting system which avoids the disadvantages of prior devices, methods and systems while affording additional structural and operating advantages.

Generally speaking, the recessed lighting system comprises a plurality of connected channel sections, wherein each channel section comprises a base having a U-shaped channel, first and second flange elements, each flange element having an upward portion extending from the base and an outward portion extending from the upward portion, and an LED positioned within the U-shaped channel. Further, the first and second flange elements are spaced a distance from the U-shaped channel to create a gap.

In specific embodiments, the base comprises a central boss proximate a first end and a central aperture proximate a second end, the central boss of one channel section being configured to fit within a central aperture of another channel section.

In specific embodiments, the plurality of connected channel sections are arranged sequentially such that a central boss of a first channel section connects within a central aperture of a second channel section to form a pivoting axis between the first channel section and the second channel section.

Specific embodiments of the recessed lighting system preferably comprise a flexible diffuser positioned within the U-shaped channel to direct light from the LED outward. The recessed lighting system may also comprise a flexible band detachably connected to the base within the gap.

In specific embodiments, each of the plurality of channel sections has a depth not greater than ⅝ inches (0.625 inches).

A component for a recessed lighting system is also disclosed. Generally speaking, the component comprises a base for connecting two or more components together, a U-shaped channel positioned on the base, and first and second flange elements. Each of the flange elements has an upward portion extending from the base and an outward portion extending from the upward portion, the upward portion being spaced a distance from the U-shaped channel.

In specific embodiments, the component base comprises a pivot axis to allow pivoting between connected components.

Specific embodiments of the component are configured wherein the first flange and the second flange elements have at least one angled edge configured to limit pivoting of connected components. Further, the outward portion of each of the first and second flange elements may comprise a degree of taper in a direction away from the U-shaped channel. Preferably, the degree of taper is equal to the pivoting range of the pivoting axis.

In specific embodiments, the component has a depth not greater than ⅝ inches (0.625 inches). This allows flush placement in standard drywall without the need for notching studs.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
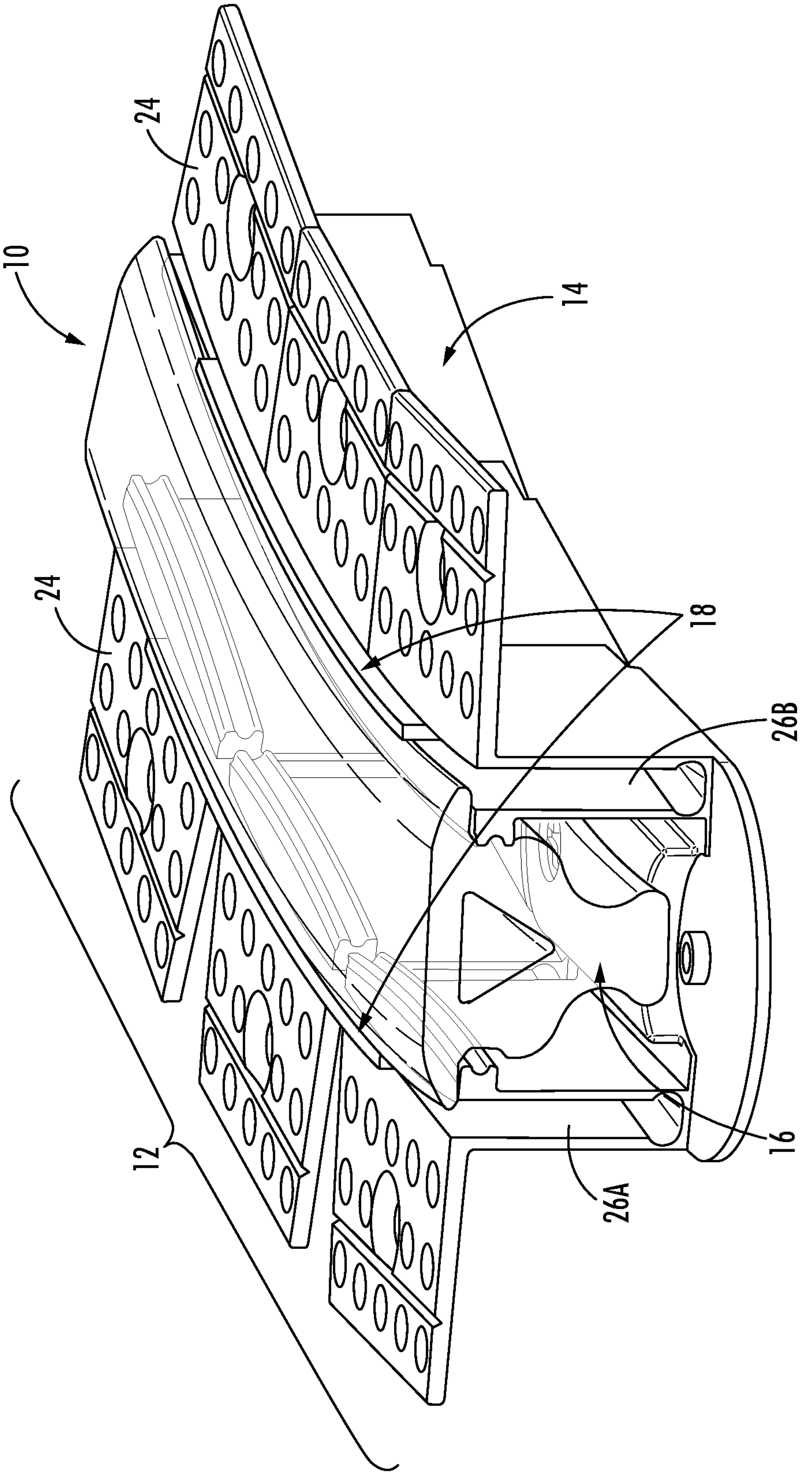
FIG. 1 is a perspective view of an embodiment of an assembled segment of the disclosed recessed channel lighting system.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-12, there is illustrated at least one embodiment of a recessed channel lighting system, generally designated by the numeral 10. The particular illustrated channel lighting system 10 is for a ceiling or wall. However, while all the embodiments illustrated are directed to a ceiling or wall, it should be understood that the principles of the invention can be more broadly applied to installation on a surface of any type, as long as there is sufficient depth for the system to be recessed.

Beginning with FIG. 1, a segment 12 of the channel lighting system 10 is shown in a preferred configuration. The illustrated segment 12 is comprised of three individual sections 14. Using these individual sections 14, the system 10 can be customized to almost any design, including curves, as it is recessed within a surface (e.g., a ceiling, wall). As will be described and illustrated, the lighting system 10 is designed to cross wall and ceiling studs without requiring notching.

Figure 2:
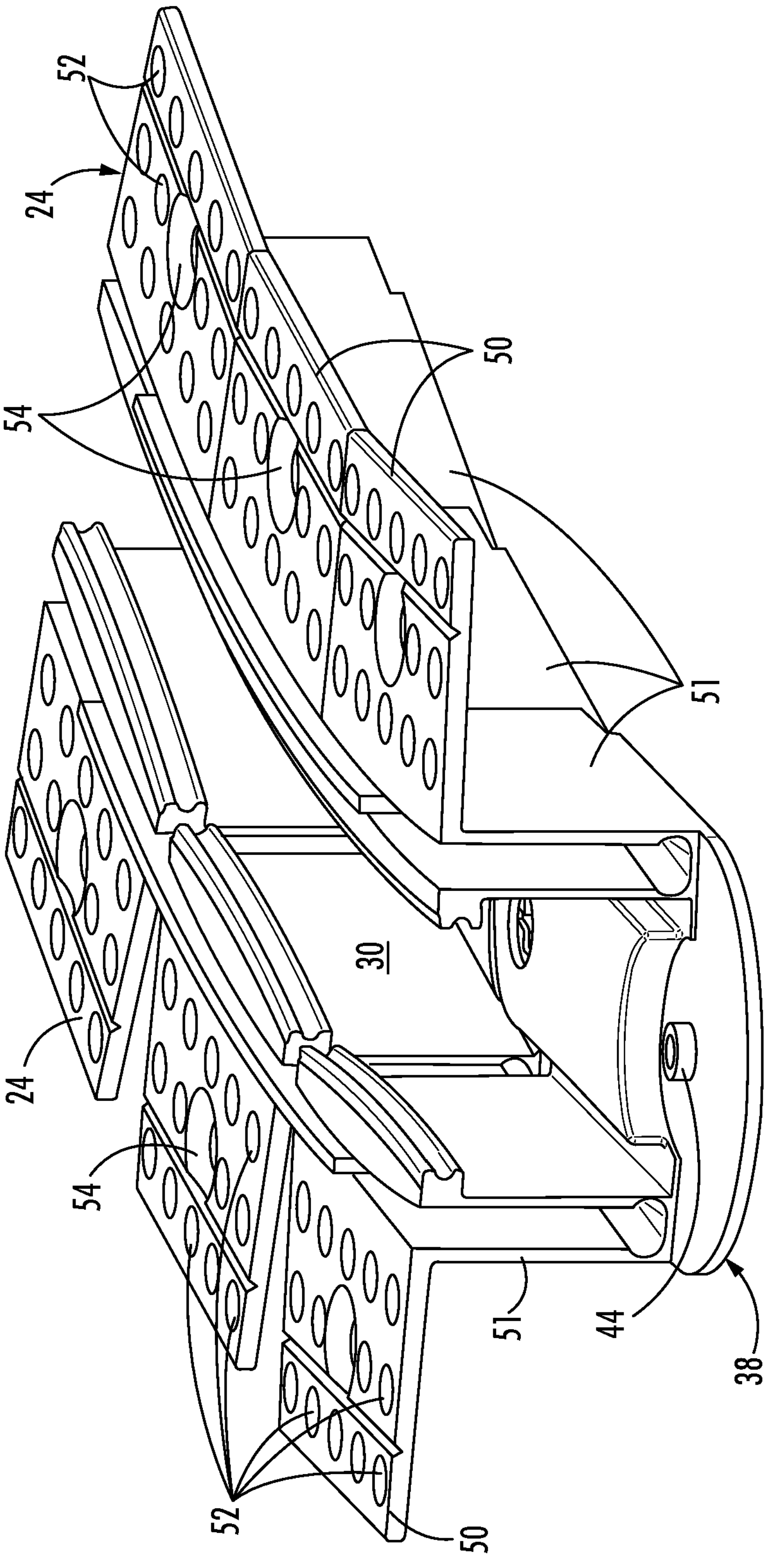
FIG. 2 is a perspective view of the assembled segment of FIG. 1 without a flexible diffuser.
Figure 3:
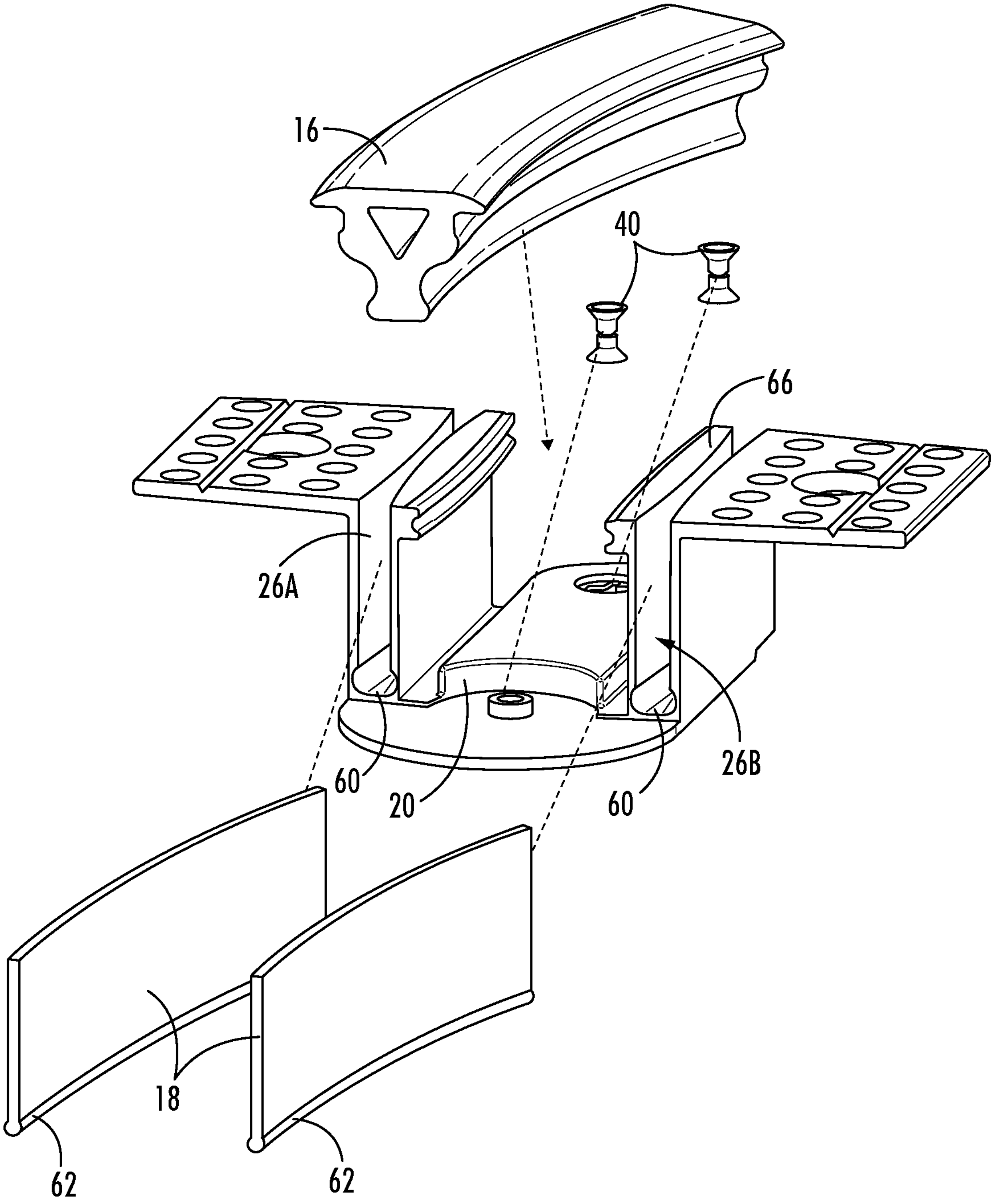
FIG. 3 is an exploded view of the embodiment of FIG. 1, highlighting individual components of an individual section of the segment.

FIGS. 2 and 3 show that, in addition to the three sections 14, each segment 12 is comprised of a flexible diffuser 16 (FIG. 1) and at least one flexible band 18, both of which are described in further detail below. Screws 40 or other fasteners are used to connect sections 14 to one another. Individual sections 14 are comprised of a base 20, a U-shaped channel 22 connected to the base 20, and side flanges 24 extending upward and outward from the base 20. Parallel channels 26A, 26B, are created between the channel 22 and the upward sidewalls 51 of the flanges 24. Flexible bands 18, which may be of any effective length, secure within the parallel channels 26A, 26B created to isolate the channel 22. This isolation may be required by various ordinances and/or building codes.

Figure 4:
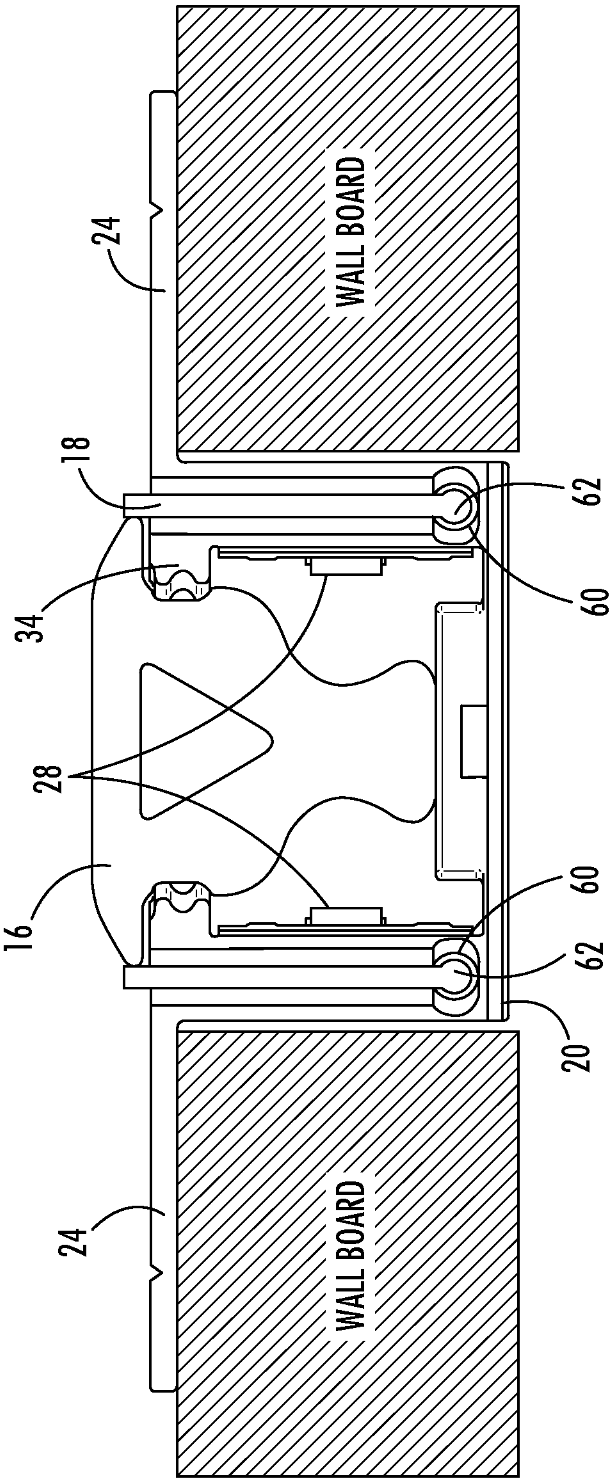
FIG. 4 is a cross-sectional view illustrating installation of a section of the disclosed channel lighting system in wall board.

As illustrated in FIG. 4, the profile of the section 14 is preferably shallow enough to fit within ⅝-inch drywall (approx. 0.625 inches or 1.59 cm). This feature allows the system 10 to be placed in a typical wall or ceiling without having to notch studs or joists. Further, the channel 22 has a width of sufficient size to allow placement of LED strips 28 along at least one of the interior of sidewalls 30. Preferably, LED strips 28 are placed along both interior sidewalls 30 for maximum light.

The channel 22 is open at the surface between the flanges 24. The flexible diffuser 16 is preferably fitted within the opening and protuberances 34 on each edge of the opening help to secure the diffuser 16 within the opening. Preferably, the diffuser 16 would have a corresponding recess 32 to allow sliding of each section 14 onto the diffuser 16.

Figure 5:
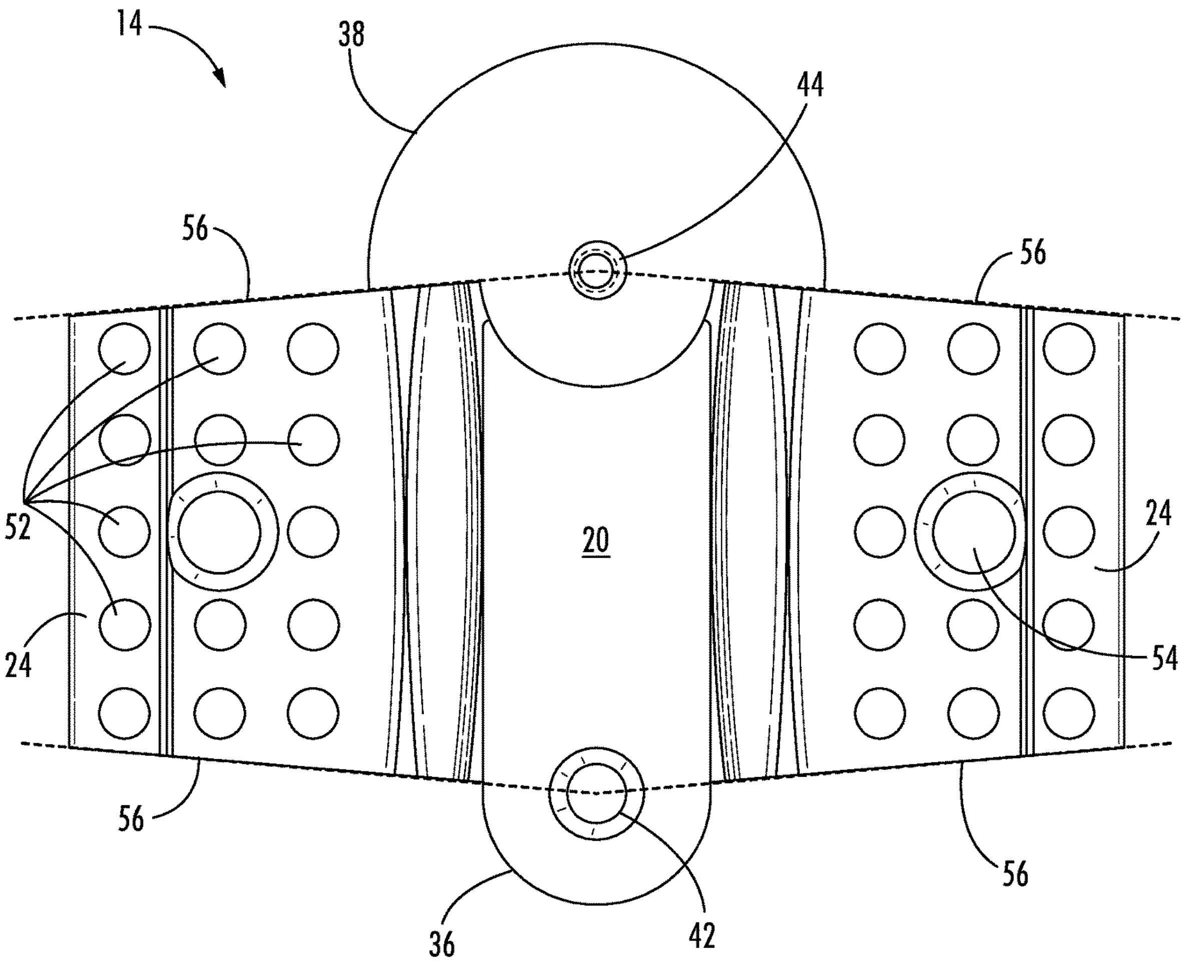
FIG. 5 is a top view of an embodiment of an individual section of the disclosed recessed channel lighting system.
Figure 6:
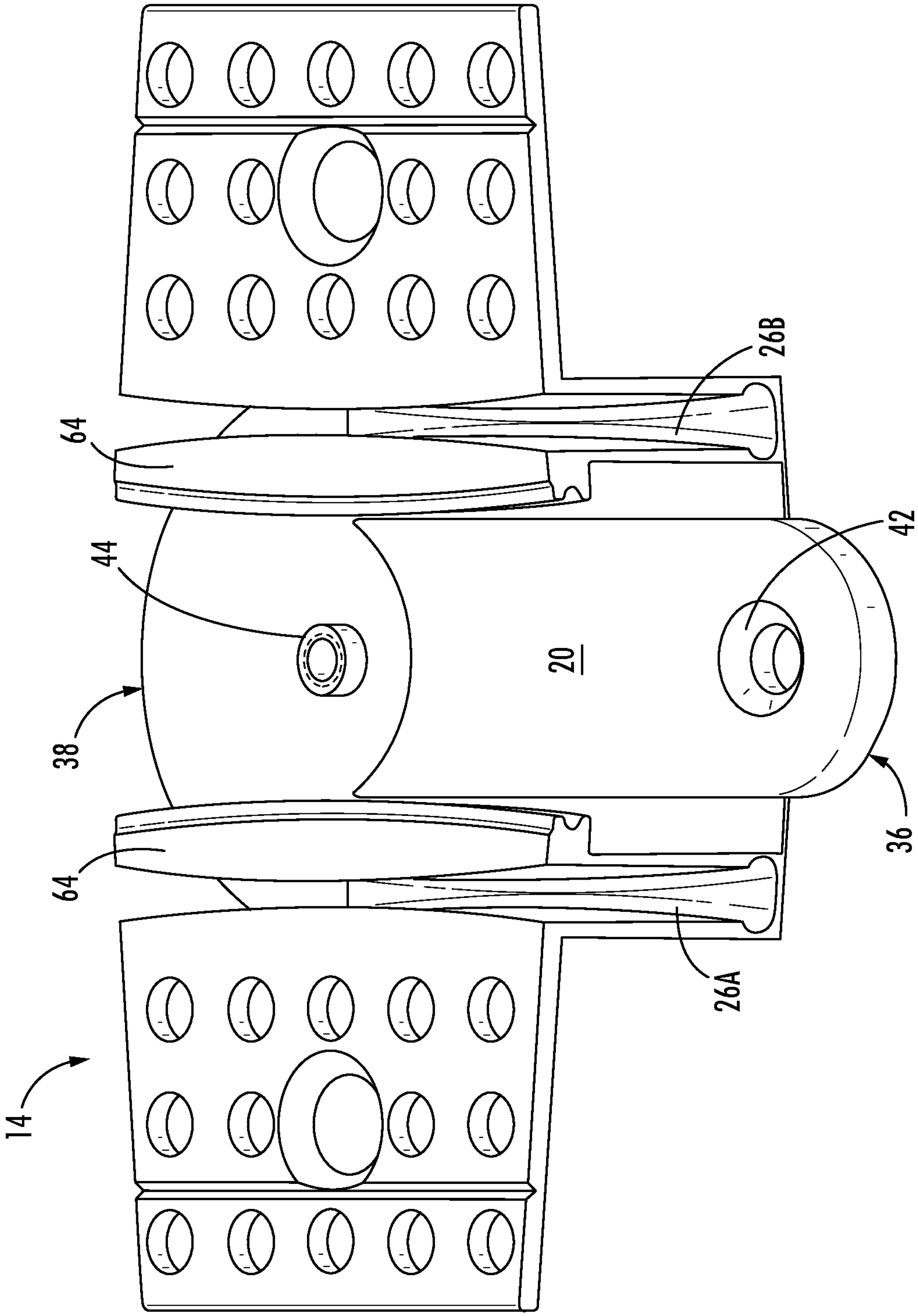
FIG. 6 is a perspective view of the embodiment of the section shown in FIG. 5.

FIGS. 5 and 6 provide a detailed top view illustration of the section 14. The base 20 is designed with a radiused end 36, having a central aperture 42, and a docking end 38, with a central boss 44. When coupling two section 14 together, the radiused end 36 of one section 14 mounts over and within the docking end 38 of the other section 14 with the boss 44 entering the aperture 42 from below. The coupling allows limited pivoting about the axis (X) created by the boss 44/aperture 42 connection. The connection may be a snap-fit or, more preferably, a screw 40 (FIG. 3) or other effective fastener may be inserted to hold the connection together.

The outward portion 50 of each flange 24 includes a plurality of openings or holes 52. These holes 52 facilitate adhesion of a joint compound or similar building material (not shown), as will be described below. A screw hole 54 within the surface of the flange 24, along with a complementary screw (not shown) can be used to secure the system 10 to a wall, ceiling or other surface.

FIGS. 5 and 6 also show the channel wall 64 and the upward portion 51 of the flanges 24 are bowed slightly toward a middle of each section 14. This configuration facilitates insertion of the flexible bands 18 into the groove 60 by having a wider "mouth" of the parallel channel 26. However, it also allows the bands 18 to adapt to any curve used in the assembled channel system 10.

Referring now to the U-shaped channel 22, it is shown to be formed of two upturned sidewalls 30 and the base 20. At the top of each sidewall 30 is an inwardly flared edge 66 which frictionally engages the flexible diffuser 16 while also allowing the diffuser 16 to adapt to any curves used in the assembled channel system 10. That is, the flared edges 66 provide a radiused surface in both directions which helps curve the diffuser 16, without kinking, when the system 10 curves.

Figure 7:
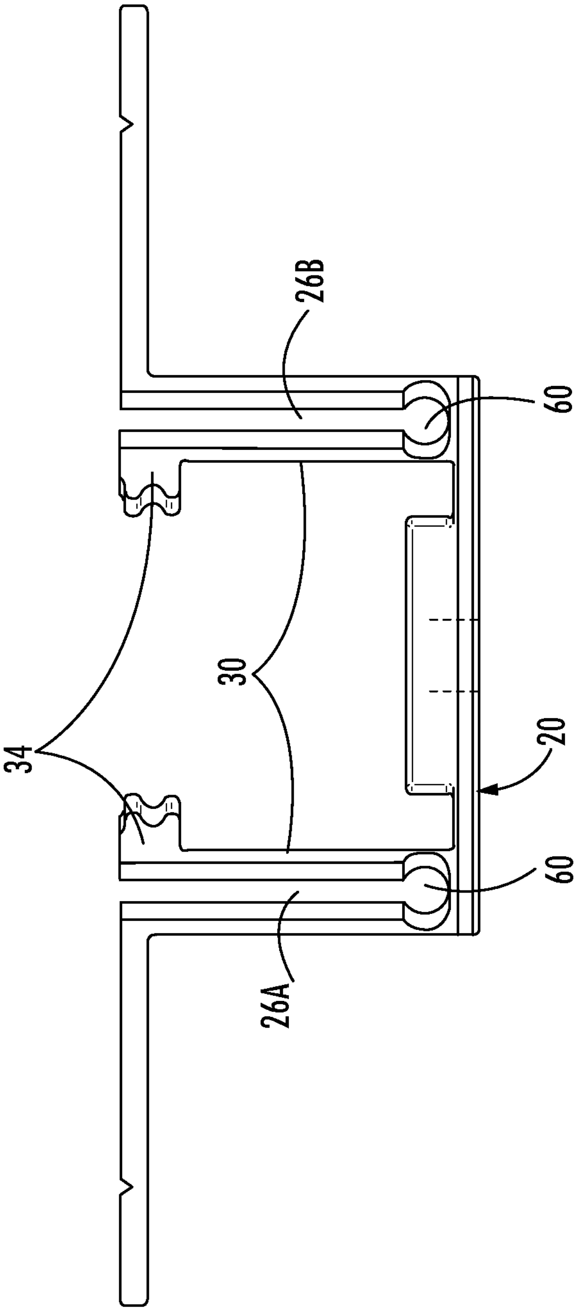
FIG. 7 is a cross-sectional view of an embodiment of a section without a diffuser, LED strip, or flexible bands.

As shown in FIG. 7, the parallel channels 26A, 26B are created between the channel 22 and the upward portion 51 of the flanges 24. At the bottom of each of the parallel channels 26A, 26B, is a groove 60. The bottom of each flexible band 18 includes a ridge 62 which inserts into the groove 60 to hold the flexible band 18 in place. The bands 18 may be any practical length, so long as a continuous wall is created to isolate the channel 22.

Figure 8:
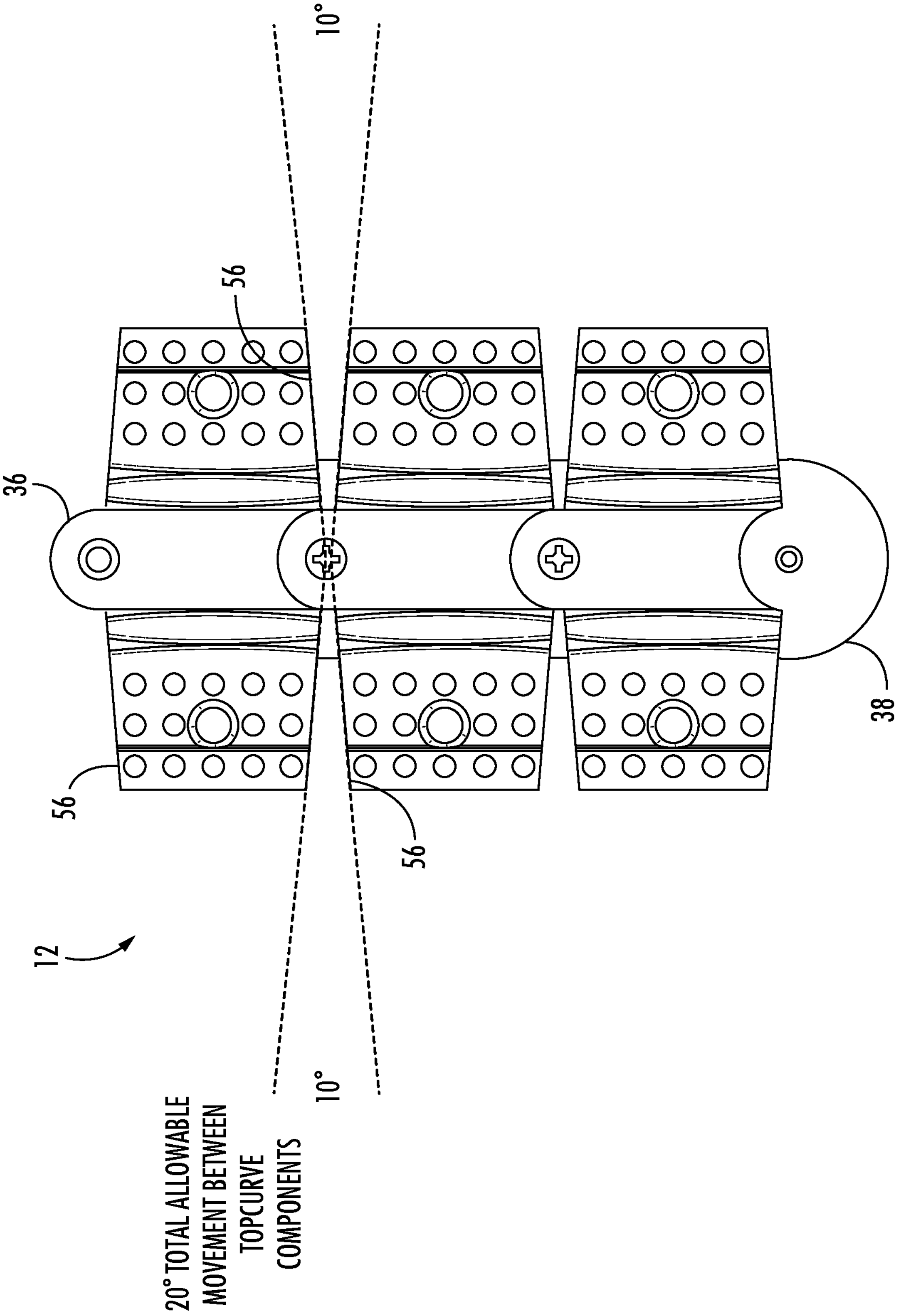
FIG. 8 is a top view of an embodiment of an uncurved segment of the disclosed recessed channel lighting system.
Figure 9:
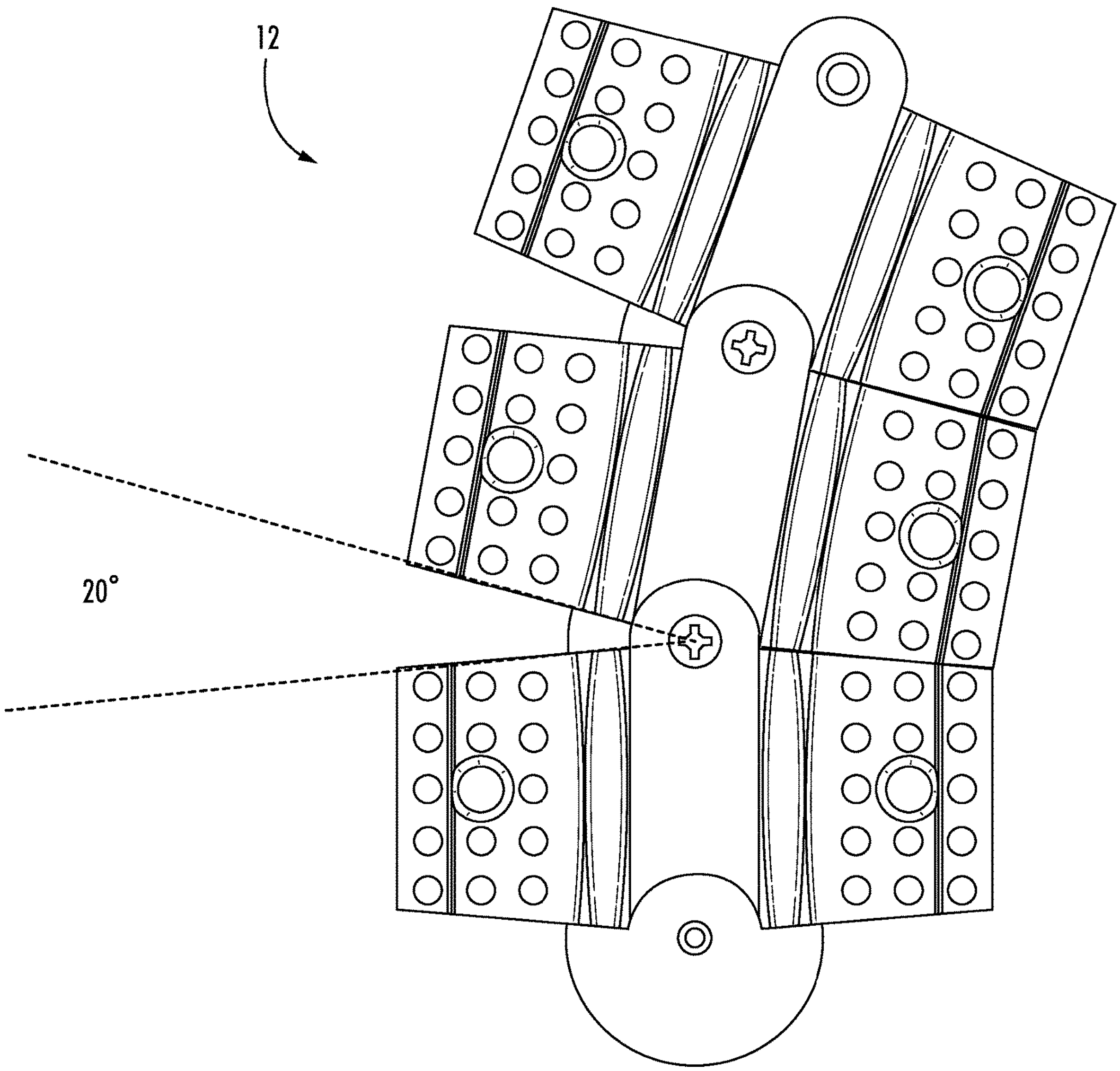
FIG. 9 is a top view of the embodiment of the segment in FIG. 8 shown in a curved orientation.
Figure 10:
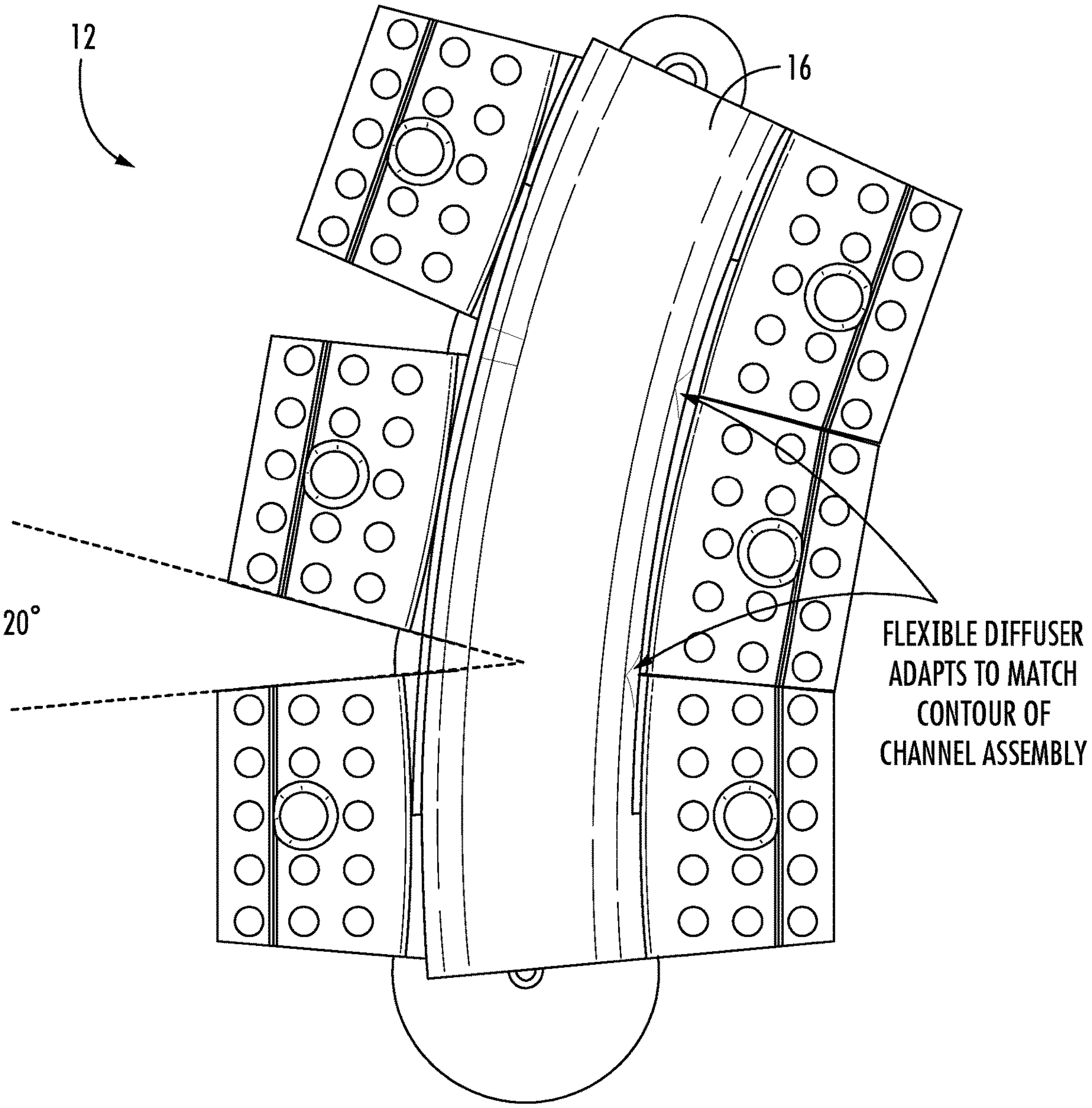
FIG. 10 is a top view of the embodiment of FIG. 8 including a flexible diffuser.

As shown in FIGS. 8-10, segments of the channel lighting system 10 are shown to be comprised of a series of individual sections 14 arranged sequentially (i.e., coupled to one another) to form a curvable light display. As shown, the outward flange portion 50 of each flange element 24 tapers in a direction away from the channel 22. The curve of the system 10 is achieved with a 5° angle cut in each end edge 56 of the flanges 24, which creates the ability to "curve" adjoining sections 14 up to approximately up 10° in either direction, or a total of an approximately 20° range, side-to-side. The taper or angle is measured from square cornered portions 50. As sections 14 are added, the curve-effect is cumulative—e.g., three adjacent sections 14 have a range of 40°, four sections 14 have a range of 60°, etc.

Further, the outward portion 50 of each flange 24, being cut at a slight angle along each end edge 56 (four total end edges), also acts as a stop between pivotably connected sections 14. For most design purposes, the angle of the edge 56 is preferably in the range of 1-15°, more preferably in the range of 3-10°, with 5° being most preferred angle for each edge 56. Of course, while it is preferred that all edges 56 be cut at the same angle, it would be possible to cut the edges 56 at different angles as well. The angles could be factory pre-cut or the edges 56 marked for cutting during construction and installation.

Figure 11:
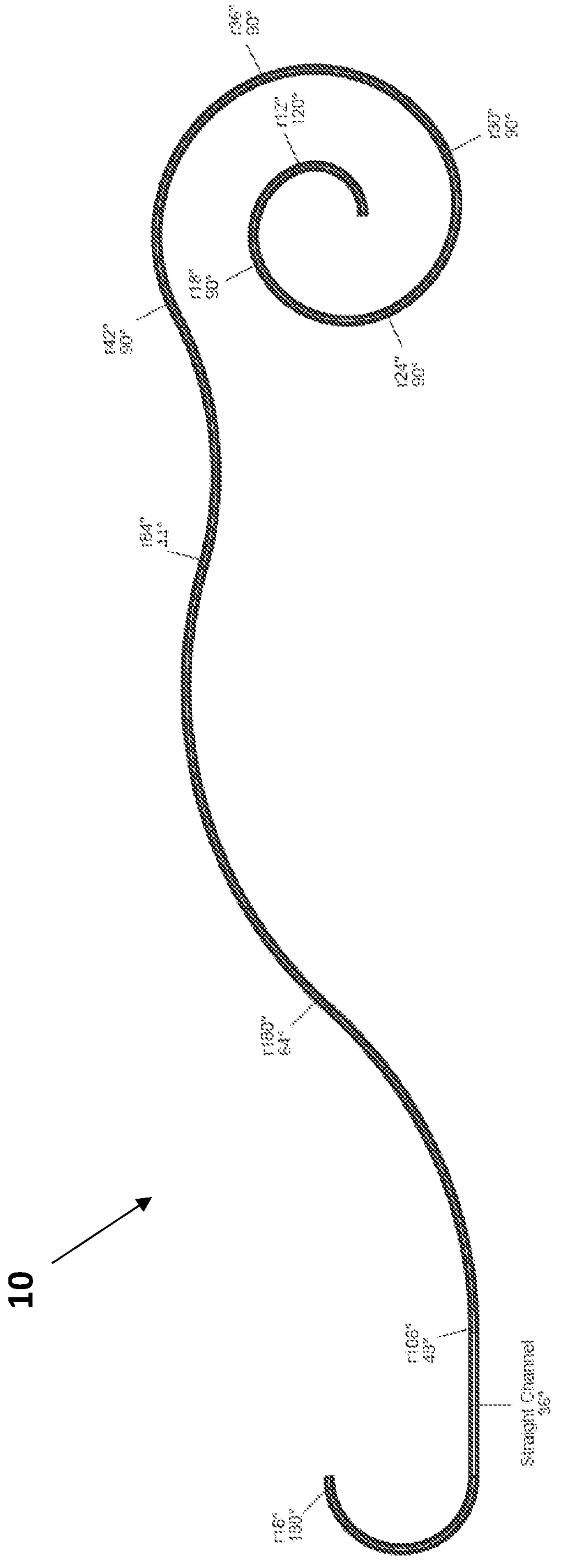
FIG. 11 is a schematic of a one specific design created using the disclosed channel lighting system.

Ultimately, when a plurality of individual sections 14 are sequentially arranged and connected by the base 20, a segment 12 is formed having a continuous channel 22 which curves as the angled flanges 24 dictate, as shown in FIG. 11. A length and degree of curve in the lighting system 10 is determined by the number of individual sections 14 coupled together and the angle used between each adjacent section 14. For example, a 30° curve could be created by adding six individual sections 14 to an assembly, with each being adjusted to angle 5° from adjacent sections. Alternatively, the curve could be less sharp (i.e., longer) by adding 10 individual sections 14, with each angling only 3° from adjacent sections. The configuration of FIG. 11 is created, starting at the left end of the system 10, using an 18-inch radius segment 12 with a 180° left bend, followed by a 36-inch straight channel segment, a 108-inch radius segment having a 48° left bend, a 180-inch radius segment with a 64° right bend, an 84-inch radius segment with a 44° left bend, then five radiused segments of 42-inches, 36-inches, 30-inches, 24-inches, and 18-inches, each with a 90° right bend, before a final 12-inch radius segment having a 120° right bend. The possible design configurations are endless.

Figure 12:
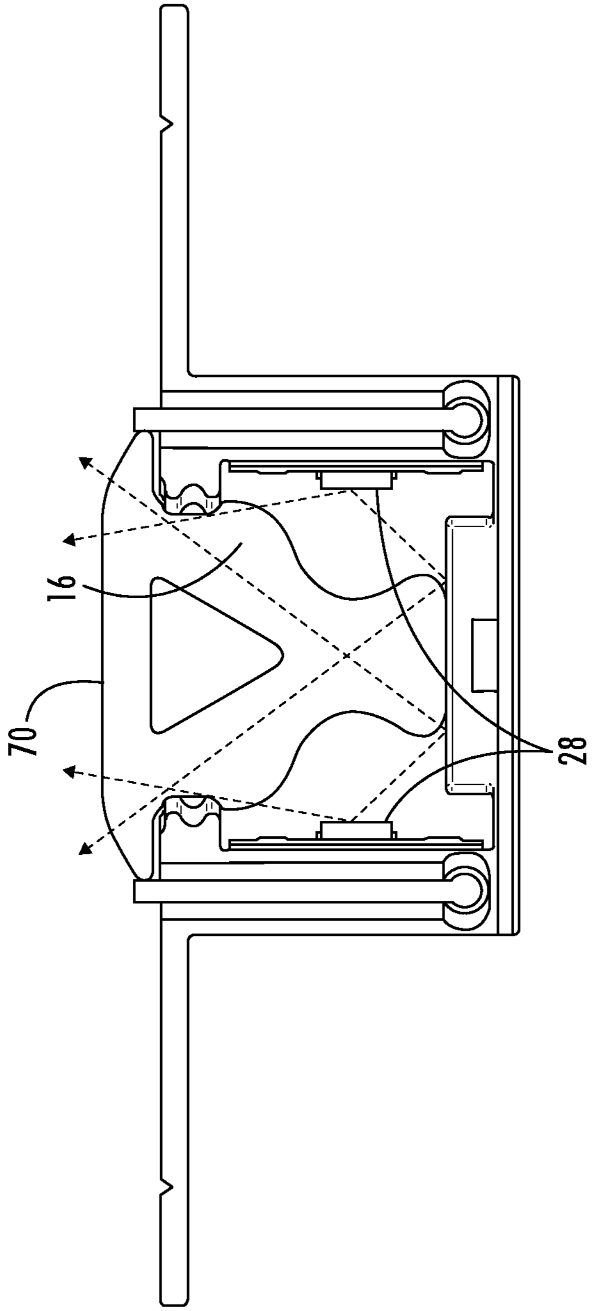
FIG. 12 is a side view of an embodiment of a section illustrating the refraction of light through the diffuser.

Referring to FIG. 12, the flexible diffuser 16 is shown securely positioned within the channel 22 resting against a bottom wall. A portion of the diffuser 16 is illustrated in FIG. 3 and is preferably comprised of an extruded translucent silicone material. The diffuser 16 is flexible and is intended to bend and curve as the resulting channel 22 requires. The diffuser 16 is easy to cut, so it can be made to almost any length and remain flexible. The shape of the diffuser 16 is unique and assists in directing light outward. However, the number of alternate shapes which would be effective for the disclosed lighting system 10 are numerous.

Light from the LED strips 28 is directed inward at the diffuser 16. However, the body of the diffuser 16 is configured such that the light which enters the diffuser 16 is refracted toward the surface 70, as illustrated by the arrows. The LED strips 28 may be white light or colored lights, as dictated by the desired result by the user/designer. Further, the LED strips 28 may be the same or different colors to create a desired effect.

Regarding installation, a path for the system 10 is preferably cut into a wall, ceiling or other surface. The path need only be wide enough to allow recess of the channel 22, while the left and right flanges 24, contact the surface. Power can be supplied to the lighting system 10 using a center feed power channel connector and/or an end feed power channel connector. These connectors allow 24 VDC power to be fed to the LED strip(s) 28 within the channel 22. A junction box can be mounted behind drywall using mounting bars, as is known in the art. The system 10 is powered by running low voltage 24 VDC wires from a remote power supply to the junction box at the start of each installed length of the recessed channel lighting system 10. At an end of an installed length of the channel lighting system 10 an end cap provides a finished look and helps prevent light leaking at the feed end of a segment where the LED strip enters the channel 22 and connects to the junction box. An "on/off" switch or dimmer may be used to control power to the lighting system 10.

Once the rigid structure of the lighting system 10 is fully constructed, including placement of LED strips 28 within the channel 22, the flexible lens/diffuser 16 can be placed into the opening at the top of the channel 22. The lighting system 10 is then positioned within the path cut into a surface and wired for power. Finishing the installation with joint compound and paint completes the project.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A recessed lighting system comprising:
- a plurality of connected channel sections, wherein each channel section comprises:
  - a base having a U-shaped channel;
  - first and second flange elements, each flange element having an upward portion extending from the base and an outward portion extending from the upward portion, wherein the first and second flange elements are spaced a distance from the U-shaped channel to create a gap; and
- an LED positioned within the U-shaped channel.

2. The recessed lighting system of claim 1, wherein the base comprises a central boss proximate a first end and a central aperture proximate a second end, the central boss of one channel section being configured to fit within a central aperture of another channel section.

3. The recessed lighting system of claim 2, wherein the plurality of connected channel sections are arranged sequentially such that a central boss of a first channel section connects within a central aperture of a second channel section to form a pivoting axis between the first channel section and the second channel section.

4. The recessed lighting system of claim 1, further comprising a flexible diffuser positioned within the U-shaped channel to direct light from the LED outward.

5. The recessed lighting system of claim 1, further comprising a flexible band detachably connected to the base within the gap.

6. The recessed lighting system of claim 1, wherein the outward portion of each of the first and second flange elements comprise a degree of taper in a direction away from the U-shaped channel.

7. The recessed lighting system of claim 3, wherein the pivoting axis has a pivoting range of at least 10 degrees.

8. The recessed lighting system of claim 6, wherein the degree of taper is in a range of 1-15 degrees from square.

9. The recessed lighting system of claim 1, wherein each of the plurality of channel sections has a depth not greater than ⅝ inches (0.625 inches).

10. A component for a recessed lighting system to create curves in the recessed lighting, the component comprising:

a base having ends for connecting two or more components together;

a U-shaped channel positioned on the base; and first and second flange elements each having an upward portion extending from the base and an outward portion extending from the upward portion, the upward portion being spaced a distance from the U-shaped channel.

11. The component of claim 10, wherein the base comprises a pivot axis to allow pivoting between connected components.

12. The component of claim 11, wherein the first flange and the second flange elements have at least one angled edge configured to limit pivoting of connected components.

13. The component of claim 10, wherein the outward portion of each of the first and second flange elements comprises a degree of taper in a direction away from the U-shaped channel.

14. The component of claim 11, wherein the pivot axis has a pivoting range of at least 10 degrees.

15. The component of claim 13, wherein the degree of taper is in a range of 1-15 degrees from square.

16. The component of claim 12, wherein the outward portion of each of the first flange and second flange elements comprises a degree of taper in a direction away from the U-shaped channel and the degree of taper is equal to a pivoting range of the pivoting axis.

17. The component of claim 13, wherein the base comprises a pivot axis to allow pivoting between connected components and the degree of taper is equal to a pivoting range of the pivoting axis.

18. The component of claim 14, wherein the outward portion of each of the first flange and second flange elements comprises a degree of taper in a direction away from the U-shaped channel and the degree of taper is equal to the pivoting range of the pivoting axis.

19. The component of claim 10, wherein the outward portion of each of the first and second flange elements comprises through holes.

20. The component of claim 10, wherein the base has a depth as measured from an underside of the outward portion of each of the first flange and second flange elements not greater than ⅝ inches (0.625 inches).

* * * * *